United States Patent
Seol

(10) Patent No.: US 11,787,377 B2
(45) Date of Patent: Oct. 17, 2023

(54) METHOD AND APPARATUS FOR CONTROLLING ELECTRIC HYDRAULIC BRAKE

(71) Applicant: HYUNDAI MOBIS CO., LTD., Seoul (KR)

(72) Inventor: Yong Cheol Seol, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 273 days.

(21) Appl. No.: 17/308,144

(22) Filed: May 5, 2021

(65) Prior Publication Data
US 2022/0234561 A1    Jul. 28, 2022

(30) Foreign Application Priority Data

Jan. 22, 2021 (KR) .................. 10-2021-0009393

(51) Int. Cl.
*B60T 13/58* (2006.01)
*B60T 13/16* (2006.01)
*B60T 13/68* (2006.01)

(52) U.S. Cl.
CPC ............ *B60T 13/58* (2013.01); *B60T 13/167* (2013.01); *B60T 13/686* (2013.01);
(Continued)

(58) Field of Classification Search
CPC ...... B60T 13/58; B60T 13/167; B60T 13/686; B60T 2270/404; B60T 2270/10; B60T 2270/82; B60T 2270/402
See application file for complete search history.

(56) References Cited

U.S. PATENT DOCUMENTS

| 6,076,897 A * | 6/2000 | Binder .................. B60T 13/686 |
| | | 303/116.1 |
| 2014/0014451 A1* | 1/2014 | Nakata .................... B60T 7/042 |
| | | 188/358 |

(Continued)

FOREIGN PATENT DOCUMENTS

| DE | 112016003965 T5 * | 6/2018 | ............ B60T 13/145 |
| JP | 2007106143 A | 4/2007 | |

(Continued)

OTHER PUBLICATIONS

Korean office action dated May 30, 2022 issued in corresponding Korean Application No. 10-2021-0009393.

*Primary Examiner* — Vishal R Sahni
(74) *Attorney, Agent, or Firm* — Novo TechIP International PLLC

(57) ABSTRACT

At least one embodiment of the present disclosure provides an electric hydraulic brake apparatus including a reservoir, a plurality of wheel brake mechanisms, a main braking system, and an auxiliary braking system, wherein the auxiliary braking system includes a first hydraulic pressure input unit and a second hydraulic pressure input unit, a third hydraulic pressure input unit configured to receive brake fluid from the main braking system without passing through booster valves, a first inlet line and a second inlet line configured to transfer a hydraulic pressure between the main braking system and the plurality of wheel brake mechanisms, and a split line configured to receive and supply the brake fluid delivered from the third hydraulic pressure input unit to the plurality of wheel brake mechanisms.

9 Claims, 4 Drawing Sheets

(52) U.S. Cl.
CPC ..... *B60T 2270/10* (2013.01); *B60T 2270/402* (2013.01); *B60T 2270/404* (2013.01); *B60T 2270/82* (2013.01)

(56) References Cited

U.S. PATENT DOCUMENTS

| | | | | |
|---|---|---|---|---|
| 2019/0241167 | A1* | 8/2019 | Peichl | B60T 13/161 |
| 2020/0139949 | A1* | 5/2020 | Dolmaya | B60T 8/4081 |
| 2020/0172067 | A1* | 6/2020 | Einig | B60T 7/042 |
| 2020/0331442 | A1* | 10/2020 | Cheon | B60Q 9/00 |
| 2020/0331444 | A1* | 10/2020 | Cheon | B60T 8/885 |
| 2021/0101575 | A1* | 4/2021 | Ahn | B60T 13/683 |
| 2021/0155215 | A1* | 5/2021 | Ganzel | B60T 11/20 |
| 2022/0144236 | A1* | 5/2022 | Koo | B60T 13/662 |
| 2022/0234561 | A1* | 7/2022 | Seol | B60T 13/167 |

FOREIGN PATENT DOCUMENTS

| | | | | |
|---|---|---|---|---|
| KR | 1020180101525 A | | 9/2018 | |
| KR | 1020190114213 A | | 10/2019 | |
| WO | WO-2020126138 A1 | * | 6/2020 | ............ B60T 13/686 |

* cited by examiner

METHOD AND APPARATUS FOR CONTROLLING ELECTRIC HYDRAULIC BRAKE

CROSS-REFERENCE TO RELATED APPLICATIONS

This application is based on, and claims priority from, Korean Patent Application Number 10-2021-0009393, filed Jan. 22, 2021, the disclosure of which is incorporated by reference herein in its entirety.

TECHNICAL FIELD

The present disclosure in some embodiments relates to an electric hydraulic brake apparatus and a control method for the same.

BACKGROUND

The statements in this section merely provide background information related to the present disclosure and do not necessarily constitute prior art.

An autonomous driving vehicle is capable of responding to a malfunction of its main braking system by employing an auxiliary braking system disposed between the main braking system and a plurality of wheel brake mechanisms to secure a fail-safe operation.

Conventionally, an auxiliary braking system performs 2-channel pressure boost/deboost control and two-channel depressurization control. For example, a conventional auxiliary braking system performs functions of increasing/decreasing braking pressure of front vehicle wheels and braking depressurization of rear wheels. For this purpose, a total of eight conduits of four input conduits and four output conduits need to be connected to the auxiliary braking system.

However, when the main braking system is normal, it delivers brake fluid to a plurality of wheel brake mechanisms by routing the brake fluid to pass through a plurality of solenoid valves installed in the auxiliary braking system. The involvement of a plurality of solenoid valves to deliver the brake fluid therethrough leads to a degradation in hydraulic response performance.

Furthermore, the auxiliary braking system is equipped with a plurality of solenoid valves involved in anti-lock braking (ABS) control. Multiple solenoid valves involved in the ABS control have a limited orifice size which aggravates the degraded hydraulic response performance.

SUMMARY

According to at least one embodiment, the present disclosure provides an electric hydraulic brake apparatus including a reservoir, a plurality of wheel brake mechanisms, a main braking system, and an auxiliary braking system. The reservoir is configured to store brake fluid. The plurality of wheel brake mechanisms is configured to provide a braking force by providing hydraulic pressure to a plurality of vehicle wheels. The main braking system is disposed between the reservoir and the plurality of wheel brake mechanisms and is configured to deliver the brake fluid discharged from the reservoir to the plurality of wheel brake mechanisms. The auxiliary braking system is disposed between the main braking system and the plurality of wheel brake mechanisms and is configured to supply the brake fluid to the plurality of wheel brake mechanisms when a failure occurs in the main braking system. Here, the auxiliary braking system includes a first hydraulic pressure input unit and a second hydraulic pressure input unit configured to receive the brake fluid from booster valves installed in the main braking system, a third hydraulic pressure input unit configured to receive the brake fluid from the main braking system without passing through the booster valves, a first inlet line and a second inlet line configured to transfer a hydraulic pressure between the main braking system and the plurality of wheel brake mechanisms, and a split line configured to receive the brake fluid delivered from the third hydraulic pressure input unit and supply the brake fluid to the plurality of wheel brake mechanisms.

DETAILED DESCRIPTION

Figure 1:
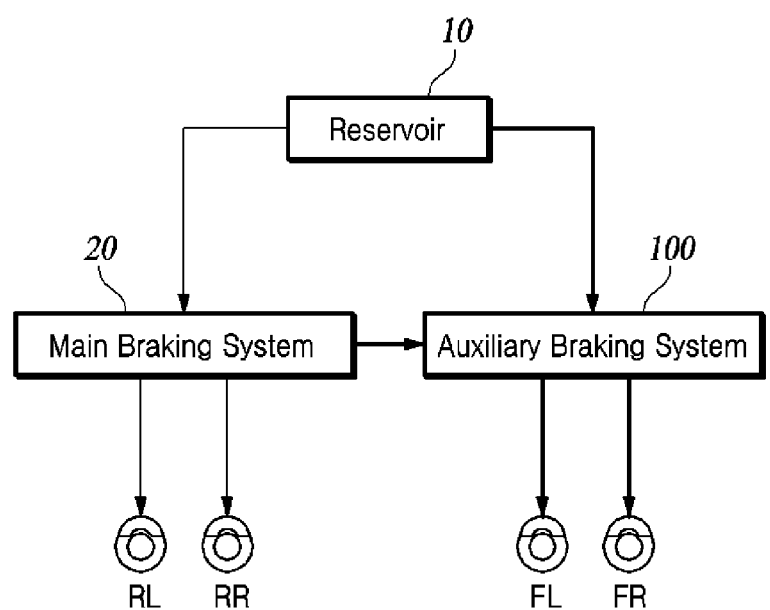
FIG. 1 is a conceptual diagram of an electric hydraulic brake apparatus according to at least one embodiment of the present disclosure.

Accordingly, the present disclosure seeks to provide an electric hydraulic brake apparatus wherein brake fluid, when supplied by the main braking system to an auxiliary braking system, is arranged not to pass through a specific solenoid valve installed in the auxiliary braking system but to be delivered by using a split line to a plurality of wheel brake mechanisms, thereby increasing hydraulic response performance.

Additionally, the present disclosure seeks to provide an electric hydraulic brake apparatus with an on-off valve having a large orifice size installed upstream of a split line to further enhance the hydraulic response performance.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for clarity and brevity.

Alphanumeric codes such as first, second, i), ii), a), b), etc., in describing components of embodiments of the present disclosure are used solely for differentiating one component from the other but not to imply or suggest the substances, the order, or sequence of the components. Throughout this specification, when a part "includes" or "comprises" a component, the part is meant to further include other components, not excluding thereof unless there is a particular description contrary thereto.

In the present disclosure, as to the relative position in the flow path or line, "in front of" or "upstream" refers to a portion wherein the brake fluid flows, which is closer to a reservoir 10, and "behind" or "downstream" refers to a portion that is farther from the reservoir 10. However, the term, upstream or downstream refers not only to upstream or downstream one of successive line portions literally but also to relatively upstream or downstream one of discrete line portions that are spaced apart.

FIG. 1 is a conceptual diagram of an electric hydraulic brake apparatus according to at least one embodiment of the present disclosure.

Figure 2:
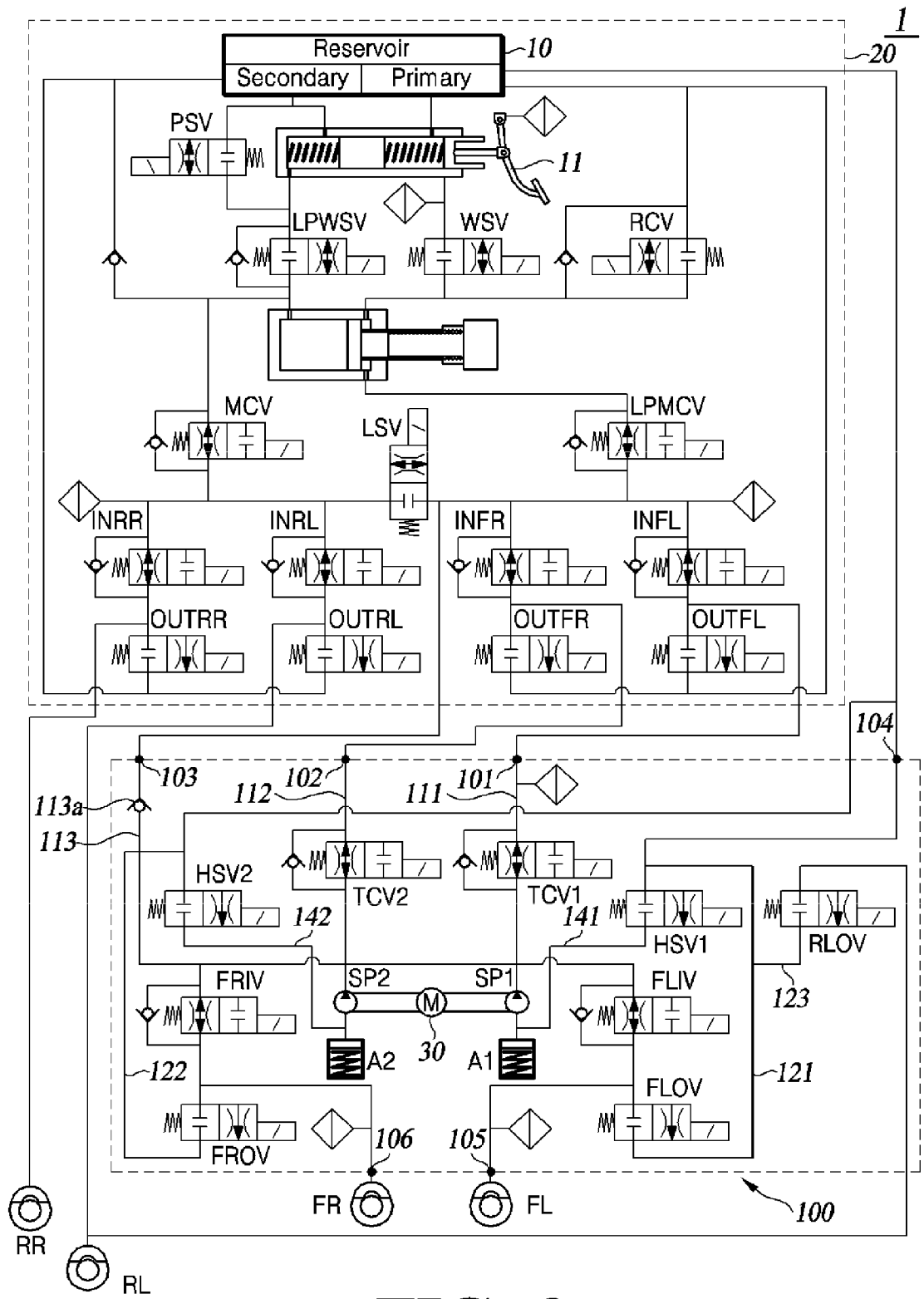
FIG. 2 is a hydraulic circuit diagram of an electric hydraulic brake apparatus according to at least one embodiment of the present disclosure.

FIG. 2 is a hydraulic circuit diagram of an electric hydraulic brake apparatus according to at least one embodiment of the present disclosure.

It should be understood that the hydraulic circuit diagram shown in FIG. 2 is merely conceptually showing the respective components for convenience of explanation and the position of the actual hydraulic pressure block and the lines formed inside the hydraulic pressure block is subject to change.

The present disclosure provides an electric hydraulic brake apparatus 1 including, among other components, the reservoir 10, a brake pedal 11, and a main braking system 20, which have arrangements and components available for a person skilled in the art to readily implement, so need not be elaborated herein by further illustrations or descriptions.

Additionally, the present disclosure includes wheel brake mechanisms with hydraulic pressure adjusted by an auxiliary braking system 100, which are illustrated as a front right wheel brake mechanism (FR) and a front left wheel brake mechanism (FL), but the merely illustrative wheel brake mechanisms may be modified to be any two of the front right wheel brake mechanism, front left wheel brake mechanism, rear right wheel brake mechanism, and rear left wheel brake mechanism.

As shown in FIGS. 1 and 2, the electric hydraulic brake apparatus 1 may include all or some of the reservoir 10, the brake pedal 11, the main braking system 20, and the auxiliary braking system 100.

The reservoir 10 is configured to store brake oil therein.

When activated by a user's pedaling, the brake pedal 11 causes a piston disposed inside of a master cylinder (both not shown) of the main braking system 20 to perform a translational motion.

The electric hydraulic brake apparatus 1 includes multiple wheel brake mechanisms FR, FL, RR, and RL which apply a braking force to multiple wheels (not shown) by using the hydraulic pressure of the brake fluid discharged from the reservoir 10. When the driver depresses the brake pedal 11, an electronic control unit (not shown) detects the driver's braking request by using a pedal travel sensor (PTS). Upon detecting the driver's braking request, the electronic control unit generates a braking signal. Here, the braking signal is an electric signal transmitted for causing the respective braking systems 20 and 100 to generate a braking force corresponding to the amount of depression of the brake pedal 11 by the driver.

The main braking system 20 is disposed between the reservoir 10 and the multiple wheel brake mechanisms FR, FL, RR, RL, and it is configured to transfer the brake fluid discharged from the reservoir 10 to the multiple wheel brake mechanisms FR, FL, RR, RL and to control the hydraulic pressure of the brake fluid. When a failure occurs in at least some of the components of the main braking system 20, the electronic control unit transmits an auxiliary braking signal to the auxiliary braking system 100. The auxiliary braking signal when transmitted by the electronic control unit to the auxiliary braking system 100 operates all or some of the components of the auxiliary braking system 100. This arrangement of the present disclosure provides fail-safe operability of the electric hydraulic brake apparatus 1.

The auxiliary braking system 100 is disposed between the main braking system 20 and the multiple wheel brake mechanisms FR and FL. During autonomous vehicle driving, when an abnormality occurs in the main braking system 20, or when a driver directly intervenes in braking, the auxiliary braking system 100 is operated in response to an abnormality occurring in the main braking system 20.

The auxiliary braking system 100 includes all or some of hydraulic pressure input units 101, 102, 103, 104, hydraulic pressure output units 105, 106, inlet lines 111, 112, a split line 113, an actuating unit 30, traction control valves TCV1, TCV2, inlet valves FLIV, FRIV, outlet lines 121, 122, 123, outlet valves FLOV, FROV, RLOV, accumulators A1, A2, circulation lines 141, 142, and high pressure switching valves HSV1, HSV2.

One or more of the hydraulic pressure input units 101, 102, 103, and 104 are disposed on the lines through which the brake fluid discharged from the main braking system 20 flows into the auxiliary braking system 100.

The inlet lines 111 and 112 are in fluid communication with the main braking system 20 by the hydraulic pressure input units 101, 102, 103, and 104. To this end, hydraulic pressure input units 101, 102, 103, and 104 are disposed in the auxiliary braking system 100. The auxiliary braking system 100 according to at least one embodiment of the present disclosure includes the first inlet line 111, the second inlet line 112, and the split line 113, and further includes the first hydraulic pressure input unit 101, the second hydraulic pressure input unit 102, and the third hydraulic pressure input unit 103.

The first hydraulic pressure input unit 101 receives the brake fluid from a front left wheel booster valve INFL installed in the main braking system 20. The second hydraulic pressure input unit 102 receives the brake fluid from the front right wheel booster valve INFR installed in the main braking system 20. The third hydraulic pressure input unit 103 is connected to a line split valve LSV installed in the main braking system 20 to receive the brake fluid from the main braking system 20. The fourth hydraulic pressure input unit 104 receives the brake fluid directly from the reservoir 10.

One or more of the hydraulic pressure output units 105 and 106 are disposed on the lines for allowing the brake fluid discharged from the auxiliary braking system 100 to flow into the multiple wheel brake mechanisms FR and FL. Thanks to the hydraulic pressure output units 105 and 106, the inlet lines 111 and 112 are in fluid communication with the multiple wheel brake mechanisms FR and FL. The auxiliary braking system 100 according to at least one embodiment includes the first hydraulic pressure output unit 105 and the second hydraulic pressure output unit 106.

Formed between the hydraulic pressure input units 101, 102 and the hydraulic pressure output units 105, 106, the inlet lines 111, 112 transfer the brake fluid discharged from the main braking system 20 to the front-wheel brake mechanisms FL, FR, respectively. The inlet lines 111, 112 include the first inlet line 111 and the second inlet line 112.

The first inlet line 111 is configured to deliver all or some of the brake fluid discharged from the main braking system 20 to the front left wheel brake mechanism FL. Additionally, the second inlet line 112 is configured to deliver all or some of the brake fluid from the main braking system 20 to the front right wheel brake mechanism FR.

On the other hand, the split line 113 is configured to transmit all or some of the brake fluid discharged from the main braking system 20 to the front right wheel brake mechanism FR and the front left wheel brake mechanism FL. More particularly, the split line 113 has one end branched from the line at its point that is installed with the line split valve LSV of the main braking system 20 and the other end that is in fluid communication with the first inlet valve FLIV and the second inlet valve FRIV.

The hydraulic pressure of the fluid flowing inside the first inlet line 111 and the second inlet line 112 may be increased by the actuating unit 30. The actuating unit 30 includes a motor configured to drive a first pump SP1 and/or a second pump SP2. The first pump SP1 has its outlet connected to a point of the first inlet line 111. The second pump SP2 has its outlet connected to a point of the second inlet line 112. At least one of the first pump SP1 and the second pump SP2 when driven may increase the internal hydraulic pressure of at least one of the inlet lines 111 and 112 connected to the respective pumps SP1 and SP2.

Disposed at a point on the first inlet line 111 is a first traction control valve TCV1 which controls the opening and closing of the first inlet line 111. In this case, the first traction control valve TCV1 is disposed in front of a junction between the first inlet line 111 and the outlet of the first pump SP1. The first traction control valve TCV1 is configured in a normally open type. Accordingly, in the non-powered mode when no auxiliary braking signal is applied, the first traction control valve TCV1 is opened. The first traction control valve TCV1 when closed may block some of the brake fluid that is pressure boosted by the first pump SP1 from flowing back to the main braking system 20.

Disposed at another point on the first inlet line 111 is a first inlet valve FLIV which controls the opening and closing of the first inlet line 111. Meanwhile, the first inlet valve FLIV is disposed behind the junction between the first inlet line 111 and the outlet of the first pump SP1. The first inlet valve FLIV is configured in a normally open type. Accordingly, in the non-power mode with no auxiliary braking signal applied, the first inlet valve FLIV is opened. The first inlet valve FLIV when closed may block some of the brake fluid that is pressure boosted by the first pump SP1 from being transmitted to the front left wheel brake mechanism FL. In this way, pressure control of brake fluid can be performed by opening and closing the inlet valves.

For details on the second inlet line 112, the second traction control valve TCV2, and the second inlet valve FRIV, reference can be made to their corresponding descriptions on the first inlet line 111, the first traction control valve TCV1, and the first inlet valve FLIV.

The split line 113 is configured to deliver all or some of the brake fluid discharged from the main braking system 20 to the front left wheel brake mechanism FL and the front right wheel brake mechanism FR. When a main braking signal is applied to the main braking system 20 by the electronic control unit, using the split line 113 connected to the third hydraulic pressure input unit 103, the brake fluid can be transmitted to the front left wheel brake mechanism FL and the front right wheel brake mechanism FR without passing through the first traction control valve TCV1 and the second traction control valve TCV2. Here, the main braking signal is a signal for the electronic control unit to control the main braking system 20 to brake the vehicle. On the other hand, the auxiliary braking signal is a signal for the electronic control unit to control the auxiliary braking system 100 to brake the vehicle when a failure occurs in the main braking system 20.

If it were a conventional auxiliary braking system that lacks the split line 113, when the main braking system 20 delivers the brake fluid to the front left wheel brake mechanism FL and the front right wheel brake mechanism FR, the brake fluid would need to pass through the first traction control valve TCV1 and the second traction control valve TCV2. Additionally, the brake fluid flows into the auxiliary braking system 100 by passing through the front-wheel booster valves INFL and INFR of the main braking system 20.

However, if the brake fluid were made to pass through the first traction control valve TCV1 and the second traction control valve TCV2 or through the front-wheel booster valves INFL and INFR, the electric hydraulic brake apparatus would have a hydraulic response delay. The hydraulic response performance is inversely proportional to the delay time that occurs in the process of transferring the hydraulic pressure to the wheel brake mechanisms when the electronic control unit brakes the vehicle by using the main braking signal. In other words, the longer the delay time, the lower the hydraulic response performance, and the shorter the delay time, the better the hydraulic response performance.

Therefore, the auxiliary braking system 100 according to at least one embodiment of the present disclosure further includes the third hydraulic pressure input unit 103 and the split line 113, thereby improving hydraulic response performance when the main braking signal is applied.

On the split line 113 of the auxiliary braking system 100, an on-off valve 113a is installed. The on/off valve 113a may be, for example, a normally open type solenoid valve or a check valve. The check valve is a valve that prevents a reverse flow of brake fluid in the line. For example, the check valve is designed so that the brake fluid does not flow from the auxiliary braking system 100 to the main braking system 20.

The auxiliary braking system 100 according to at least one embodiment of the present disclosure can further improve the hydraulic response performance by opening or closing the split line 113 by using the on-off valve 113a.

Used for the on-off valve 113a may be a solenoid valve having a large orifice size, unlike a general solenoid valve, for example, an inlet valve or an outlet valve. Here, the orifice size means the cross-sectional area of the solenoid valve at the point where the brake fluid is discharged through the solenoid valve.

The brake fluid flowing into the auxiliary braking system 100 passes through the on-off valve 113a having a large orifice size so that the brake fluid is quickly transferred to the front-wheel brake mechanisms FL and FR. Therefore, the on-off valve 113a having a large orifice size can further improve the hydraulic response performance.

The outlet lines 121, 122, 123 include the first outlet line 121, the second outlet line 122, and the third outlet line 123.

The first outlet line 121 and the second outlet line 122 are each configured to be connected to a point of the first inlet line 111 or the second inlet line 112 so that the first inlet line 111 or the second inlet line 112 have its brake fluid at least partially branched off.

The first outlet line 121 has one end connected to a bifurcation formed on the first inlet line 111 downstream of the first inlet valve FLIV and the other end connected to an inlet of the first pump SP1.

The first outlet line 121 is installed at a point with a first outlet valve FLOV which controls the opening and closing of the first outlet line 121. The first outlet valve FLOV is configured in a normal-close type. Accordingly, in the non-power mode with no auxiliary braking signal being applied, the first outlet valve FLOV is closed. The first outlet valve FLOV when opened discharges at least some of the pressure boosted brake fluid flowing through the first inlet line 111 to the first outlet line 121. This may reduce the hydraulic pressure transmitted to the front left wheel brake mechanism FL.

The first outlet line 121 may be further installed at another point with the first accumulator A1 downstream of the first outlet valve FLOV. The first accumulator A1 is configured to temporarily receive all or some of the brake fluid delivered from the first outlet line 121. This configuration can minimize damage to the first outlet line 121 due to hydraulic pulsation of the brake fluid. Here, the damage occurring to the first outlet line 121 means, for example, that the line when exposed to continuous pulsation for a long time suffers from fatigue, deformation, abrasion, or other degradation occurring in at least a part thereof.

For details on the second outlet line 122, the second outlet valve FROV, and the second accumulator A2, reference can be made to their corresponding descriptions on the first outlet line 121, the first outlet valve FLOV, and the first accumulator A1.

Meanwhile, the third outlet line 123 is connected to the rear left wheel brake mechanism RL to depressurize the brake fluid supplied thereto. The detailed description of the present disclosure illustrates a configuration with the rear left wheel brake mechanism RL, although another embodiment of the present disclosure may have the third outlet line 123 connected to the rear right wheel brake mechanism RR.

On the other hand, the electronic control unit (not shown) of the auxiliary braking system 100 according to at least one embodiment determines whether to use the accumulators A1 and A2 according to the required braking quantity. For example, in case of slow braking, only some of the outlet valves FLOV, FROV, RLOV is opened for allowing some limited brake fluid to pass through the thus opened outlet lines among the outlet lines 121, 122, 123, while allowing the brake fluid to be branched off from the inlet lines 111 and 112. At this time, since the amount of the brake fluid that is branched off is relatively small compared to when making a sudden braking, the brake fluid needs not to be accommodated in the accumulators A1 and A2. However, in the case of sudden braking, all of the outlet valves FLOV, FROV, and RLOV are opened for allowing the brake fluid to pass through all of the outlet lines 121, 122, and 123 and branches off from the inlet lines 111 and 112. At this time, since the amount of the branched brake fluid is larger than that of slow braking, the brake fluid is received in the accumulators A1 and A2.

The third outlet line 123 has one end connected to a point on the line connected to the rear left wheel brake and the other end connected to the first outlet line 121. At this time, the junction between the third outlet line 123 and the first outlet line 121 is formed downstream of the first outlet valve FLOV. For this reason, the brake fluid delivered by the third outlet line 123 may merge with the brake fluid flowing inside the first outlet line 121.

The third outlet line 123 leads to one or more of the first outlet line 121 and the second outlet line 122. For example, as shown in FIG. 2 of the present embodiment, the first outlet line 121 and the second outlet line 122 are interconnected, and they may be in fluid communication with each other. In this case, the brake fluid delivered by the third outlet line 123 may be received in at least one of the first accumulator A1 and the second accumulator A2. However, the present disclosure is not necessarily limited to this configuration, and the first outlet line 121 and the second outlet line 122 may not be interconnected, wherein the brake fluid delivered by the third outlet line 123 merges only with the first outlet line 121 and is received in the first accumulator A1. Meanwhile, in another embodiment not including the accumulators A1 and A2, the third outlet line 123 may be designed to render the brake fluid to be recovered to the reservoir.

The third outlet line 123 is installed at one point with the third RLOV which controls the opening and closing of the third outlet line 123. The third outlet valve RLOV is formed in a normal-close type. Accordingly, in the non-power mode, the third outlet valve RLOV is closed.

The first circulation line 141 is installed at one point with the first high pressure switching valve HSV1 which controls the opening and closing of the first circulation line 141. The first high-pressure switching valve HSV1 is formed in a normal-close type. Therefore, in the non-power mode, the first high-pressure switching valve HSV1 is closed. When the first high-pressure switching valve HSV1 is opened, the brake fluid is provided to the actuating unit 30.

For details on the second circulation line 142 and the second high-pressure switching valve HSV2, reference can be made to their corresponding descriptions on the first circulation line 141 and the first high-pressure switching valve HSV1.

Figure 3:
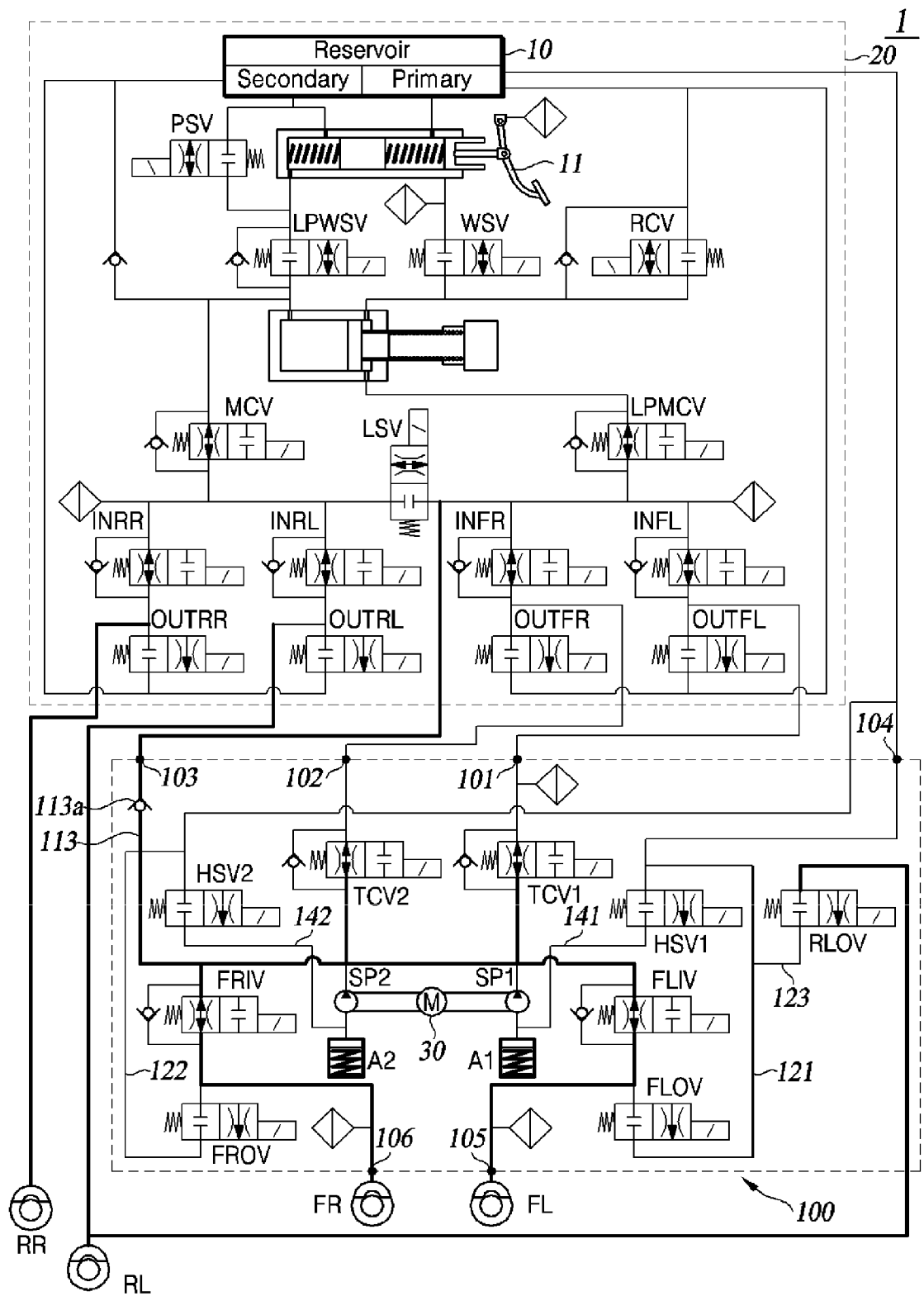
FIG. 3 is a hydraulic circuit diagram of an electric hydraulic brake apparatus with a main braking system when in a normal condition supplying brake fluid to front and rear wheel brakes, according to at least one embodiment of the present disclosure.

FIG. 3 is a hydraulic circuit diagram of an electric hydraulic brake apparatus with a main braking system when in a normal condition supplying brake fluid to front and rear-wheel brakes, according to at least one embodiment of the present disclosure.

In FIG. 3, fluid lines indicated by a thick solid line indicate lines through which brake fluid flows.

The electronic control unit generates a braking signal based on the drivers braking request and supplies the brake fluid to the multiple wheel brake mechanisms FL, FR, RL, and RR.

The electronic control unit may perform a failure determination process of determining whether the main braking system 20 is normal before supplying the brake fluid to the multiple wheel brake mechanisms FL, FR, RL, RR. In particular, upon determining that the main braking system 20 is normal, the electronic control unit uses the same system 20 to supply the brake fluid to the wheel brake mechanisms FL, FR, RL, and RR.

When the main braking system 20 is normal, the electronic control unit transmits a main braking signal to the main braking system 20 for controlling to supply the brake fluid to the multiple wheel brake mechanisms FL, FR, RL RR. For example, the electronic control unit controls main braking rear-wheel booster valves INRL and INRR of the main braking system 20 and thereby controls to supply the brake fluid to the rear-wheel brake mechanisms RL and RR. Additionally, the electronic control unit uses the split line 113 for controlling to supply the brake fluid to the front-wheel brake mechanisms FL and FR. Here, when the electronic control unit boosts the pressure of the front-wheel brake mechanisms FL and FR, the brake fluid passes neither the front-wheel booster valves INFL and INFR installed in the main braking system 20 nor the traction control valves TCV1 and TCV2 installed in the auxiliary braking system 100. This allows the electric hydraulic brake apparatus 1 according to at least one embodiment of the present disclosure to increase hydraulic response performance when boosting the pressure for the front-wheel brake mechanisms FL and FR.

Additionally, with a solenoid valve having a large orifice size used as the on-off valve 113a, the present disclosure can further increase the hydraulic response performance when boosting the pressure for the front-wheel brake mechanisms FL and FR.

Figure 4:
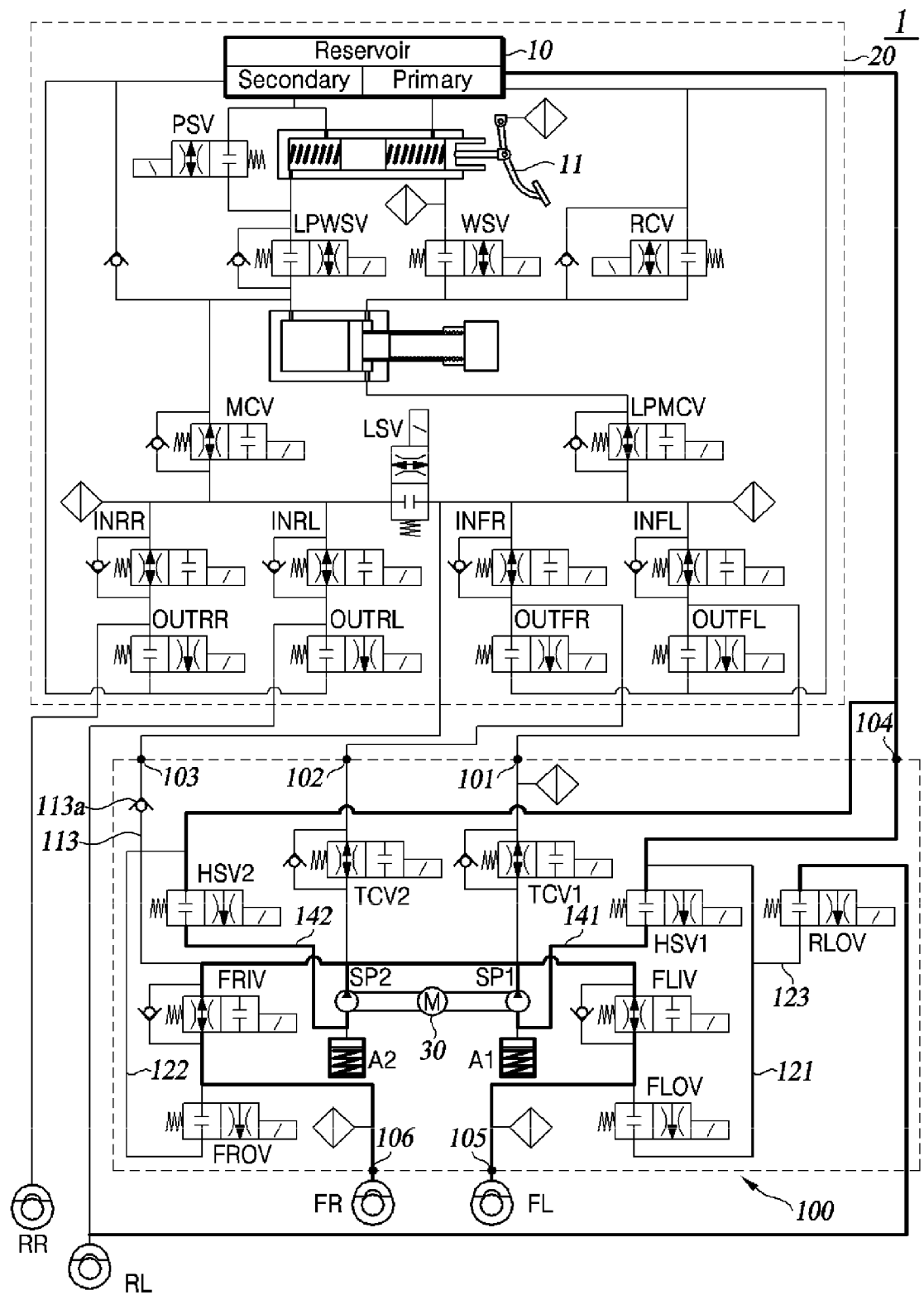
FIG. 4 is a hydraulic circuit diagram of an electric hydraulic brake apparatus with the main braking system when in failure, supplying brake fluid to a front-wheel brake by using an auxiliary braking system, according to at least one embodiment of the present disclosure.

FIG. 4 is a hydraulic circuit diagram of an electric hydraulic brake apparatus with the main braking system when in failure, supplying brake fluid to a front-wheel brake by using an auxiliary braking system, according to at least one embodiment of the present disclosure.

In FIG. 4, fluid lines indicated by a thick solid line indicate lines through which brake fluid flows.

When the main braking system 20 is in a failure, the electronic control unit transmits a main braking signal to the auxiliary braking system 100 for controlling to supply the brake fluid to the front-wheel brake mechanisms FL and FR. Additionally, the electronic control unit brakes the rear wheels by using an electronic parking brake.

The auxiliary braking system 100 according to at least one embodiment of the present disclosure does not participate in the pressure boost control for the rear left wheel brake mechanism RL and the rear right wheel brake mechanism RR. Particularly, the auxiliary braking system 100 increases and decreases the pressure for two front wheel brake mechanisms and depressurizes one rear wheel brake mechanisms. Additionally, when the main braking system 20 is normal and when the main braking system 20 supplies the brake fluid to the front-wheel brake mechanisms FL and FR, the split line 113 is used to bypass a specific solenoid valve, thereby enhancing the hydraulic operation performance. Additionally, with a valve having a large orifice size used as a valve for opening and closing the split line 113, the present disclosure can further increase the hydraulic operation performance.

As described above, according to some embodiments, the present disclosure can provide an electric hydraulic brake apparatus wherein brake fluid, as supplied by the main braking system to the auxiliary braking system, is arranged not to pass through a specific solenoid valve installed in the auxiliary braking system but to be delivered through the split line to the multiple wheel brake mechanisms, thereby increasing the hydraulic response performance.

Additionally, the present disclosure can provide the electric hydraulic brake apparatus with the on-off valve having a large orifice size installed upstream of the split line to further enhance the hydraulic response performance.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. An electric hydraulic brake system comprising:
    a reservoir configured to store a brake fluid;
    a wheel brake system configured to provide a hydraulic pressure to a plurality of vehicle wheels to generate a braking force;
    a main braking system disposed between the reservoir and the wheel brake system and configured to deliver the brake fluid discharged from the reservoir to the wheel brake system; and
    an auxiliary braking system disposed between the main braking system and the wheel brake system and configured to supply the brake fluid to the wheel brake system when a failure occurs to the main braking system,
    wherein the auxiliary braking system comprises:
        first and second hydraulic pressure inputs configured to receive the brake fluid from a plurality of booster valves positioned in the main braking system;
        a third hydraulic pressure input separated from the first and second hydraulic pressure inputs and configured to receive the brake fluid from the main braking system without passing through the plurality of booster valves;
        first and second inlet lines configured to transfer a hydraulic pressure between the main braking system and the wheel brake system;
        a first traction control valve connected to the first inlet line and configured to control opening and closing of the first inlet line;
        a second traction control valve connected to the second inlet line and configured to control opening and closing of the second inlet line; and
        a split line configured to receive the brake fluid delivered from the third hydraulic pressure input and supply the brake fluid to the wheel brake system without passing through the first and second traction control values.

2. The electric hydraulic brake system of claim 1, wherein the auxiliary braking system comprises:
    an actuating unit comprising first and second pumps connected to the first and second inlet lines, respectively, and configured to increase an internal hydraulic pressure of the first and second inlet lines, respectively;
    a first outlet line branching from the first inlet line and extending between a bifurcation of the first inlet line and an inlet of the first pump; and
    a second outlet line branching from the second inlet line and extending between a bifurcation of the second inlet line and an inlet of the second pump.

3. The electric hydraulic brake system of claim 1, wherein the auxiliary braking system comprises an on-off valve configured to open and close the split line.

4. The electric hydraulic brake system of claim 3, wherein the on-off valve comprises a normally open type solenoid valve.

5. The electric hydraulic brake system of claim 4, wherein an orifice size of the on-off valve is greater than that of the booster valves.

6. The electric hydraulic brake system of claim 3, wherein an orifice size of the on-off valve is greater than that of the booster valves.

7. The electric hydraulic brake system of claim 1, wherein the auxiliary braking system comprises:
    a first inlet valve connected to the first inlet line and configured to control opening and closing of the first inlet line; and
    a second inlet valve connected to the second inlet line and configured to control opening and closing of the second inlet line.

8. The electric hydraulic brake system of claim 2, wherein the auxiliary braking system comprises:
    a first outlet valve connected to the first outlet line and configured to control opening and closing of the first outlet line; and a second outlet valve connected to the second outlet line and configured to control opening and closing of the second outlet line.

9. The electric hydraulic brake system of claim 1, wherein the wheel brake system comprises a plurality of wheel brakes.

\* \* \* \* \*